(No Model.)

C. A. VON MALTZAHN.
CULTIVATION OF ASPARAGUS.

No. 571,273. Patented Nov. 10, 1896.

UNITED STATES PATENT OFFICE.

CARL AXEL VON MALTZAHN, OF BLÜCHERHOF, GERMANY.

CULTIVATION OF ASPARAGUS.

SPECIFICATION forming part of Letters Patent No. 571,273, dated November 10, 1896.

Application filed September 21, 1894. Serial No. 523,712. (No model.) Patented in Germany August 17, 1894, No. 82,449; in Luxemburg August 18, 1894, No. 2,902; in England August 22, 1894, No. 15,984; in Spain August 27, 1894, No. 16,250; in Belgium August 29, 1894, No. 115,596; in Hungary September 10, 1894, No 1,069; in Italy September 28, 1894, No. 37,296; in Austria October 24, 1894, No. 44/5,650; in France August 22, 1895, No. 240,852, and in Denmark September 27, 1895, No. 209.

*To all whom it may concern:*

Be it known that I, CARL AXEL VON MALTZAHN, of Blücherhof, near Vollrathsruhe, Mecklenburg, in the Empire of Germany, have invented new and useful Improvements in the Cultivation of Asparagus, (patented in Germany, No. 82,449, dated August 17, 1894; in England, No. 15,984, dated August 22, 1894; in Austria, No. 44/5,650, dated October 24, 1894; in Hungary, No. 1,069, dated September 10, 1894; in Belgium, No. 115,596, dated August 29, 1894; in Italy, No. 37,296, dated September 28, 1894; in Spain, No. 16,250, dated August 27, 1894; in Luxemburg, No. 2,902, dated August 18, 1894; in Denmark, No. 209, dated September 27, 1895, and in France No. 240,852, dated August 22, 1895,) of which the following is a specification.

The object of the present invention is a new means of cultivating asparagus, by which an agricultural product that leaves nothing to be desired is gained, at the same time enabling the agriculturalist to simplify and accelerate the forcing process. The labor required for tending and gathering is also decreased by the application of this invention, and no damage can be done to the growing shoots while cutting and gathering those that are fit for use, so that this invention represents an important progress in agriculture.

Figure 1:
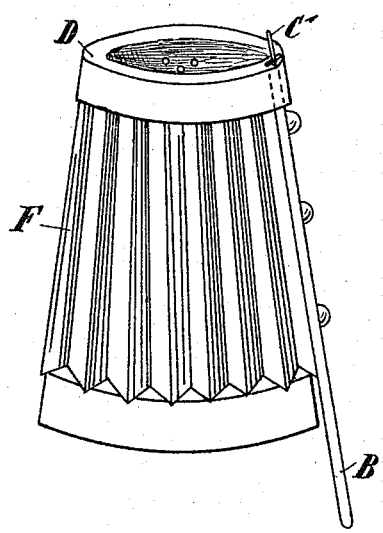
Figure 2:
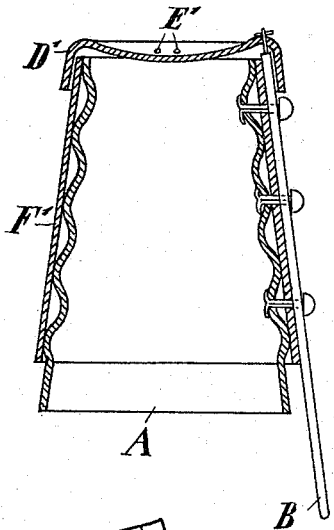
Figure 3:
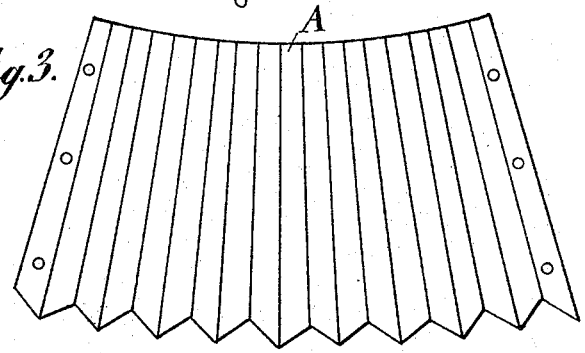
Figure 4:
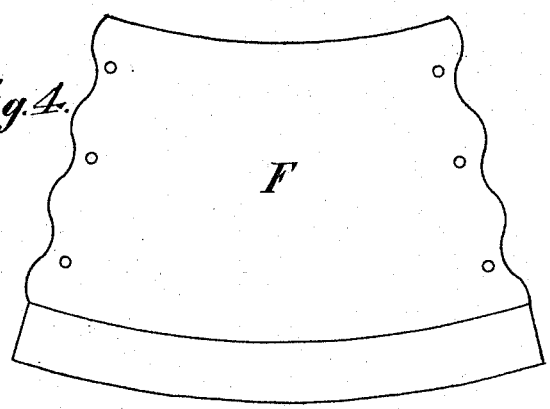

The accompanying drawings illustrate the cases employed for this method, as follows:

Figure 1 is a perspective view of the case in question; Fig. 2, a vertical section through the cap in Fig. 1; Fig. 3, the exterior, and Fig. 4 the interior, side of the case in Fig. 1 in an unfolded condition.

At present the forcing of asparagus is done by heaping up humus in winter after the leaves have been removed. The plant is then left to itself.

According to the present method cases, as shown in Fig. 1, of a material impervious to light and heat are placed over each old plant in spring, as soon as vegetation begins, and closed by a lid which may be opened for the inspection of the isolated plant. By this arrangement the young growth is isolated from the light and the influence of the warmth and air arising from the ground is secured. The effect reached in this manner is amazing. A plant which formerly required four to six weeks for its full development is raised in nine to ten days to the same state by this method. Instead of being compelled to inspect the plant three times a day, as has been hitherto necessary, it is sufficient to look after the same every three days only, so that a considerable amount of labor may be dispensed with. The chief advantage is offered by the fact that the whole of the plants may be viewed in the cases, so that damaging while cutting is prevented, while hitherto stems were either broken off or pricked on account of their being wholly or partly underground. These cases are placed several centimeters deep into the earth and have a fixed position after the rod or rods have been pushed into the ground.

Figs. 1 and 2 show the case, consisting principally of four parts, an interior cover A, an exterior cover F, a lid D to be opened, and a rod B, riveted to the two covers at one side. Both covers have an equal height, while the interior cover A is prolonged in a downward direction and serves to introduce the case into the ground. Rod B is arranged in the longitudinal direction of both covers. It has a somewhat greater length than the interior cover A. This rod serves to give stability to the case and to act as a pivot for the lid D at the top C. This lid D is supplied with several small holes E, which are of great importance, although they appear to be of no account. These holes are applied for the following purposes: First, that in case of rain the drops may run downward, and, secondly and principally, that the growth of the asparagus-plants takes place only in an upward direction, which purpose is perfectly reached by the few sunbeams penetrating through the small perforations. The double sides are also very essential, as the inclosed air forms an excellent isolator against the influence of the weather. In order to bring both covers A and F in a fixed position, when placed one upon the other, and to be able to inclose at the same time a certain quantity of air, both of them are either sloped out or ribbed. These grooves of the one cover must be directed either vertically or at right angles to those of the other cover, so that they lie either in the direction of the longitudinal axis or of the periphery. In this manner every four points next to each other come into contact with each other at the projecting ends of the grooves, thus forming the space for the air.

Having now described my invention, what I claim, and desire to secure by Letters Patent, is—

A double-walled case for cultivating vegetables, both walls of which are provided on their opposing faces with grooves or ribs; the two sets of ribs being at an angle to each other.

In witness whereof I have hereunto signed my name in the presence of two subscribing witnesses.

CARL AXEL VON MALTZAHN.

Witnesses:
CHAS. H. DAY,
W. HAUPT.